United States Patent

Gates, Jr. et al.

[15] 3,697,683

[45] Oct. 10, 1972

[54] FACSIMILE SCAN LINE RESPONSE EQUALIZATION SYSTEM

[72] Inventors: Percival T. Gates, Jr., Weston, Mass.; Albert H. Libbey, Moultonboro, N.H.

[73] Assignee: EG & G, Inc., Bedford, Mass.

[22] Filed: Dec. 7, 1970

[21] Appl. No.: 95,664

[52] U.S. Cl. .......... 178/7.1, 178/6

[51] Int. Cl. .......... H04n 1/40

[58] Field of Search .......... 178/5, 6, 7.1

[56] References Cited

UNITED STATES PATENTS

| | | | |
|---|---|---|---|
| 2,965,711 | 12/1960 | James et al. | 178/7.2 |
| 3,505,470 | 4/1970 | Gorog | 325/30 |
| 2,929,871 | 3/1960 | Cross | 178/7.1 |
| 2,804,497 | 8/1957 | Eliot | 178/7.1 |

*Primary Examiner*—Robert L. Griffin
*Assistant Examiner*—George G. Stellar
*Attorney*—Ralph L. Cadwallader and Lawrence P. Benjamin

[57] ABSTRACT

The facsimile scan line response equalization system described includes a source of facsimile scan line video signals inherently having a non-uniform response along each scan line. Means are provided to produce a scan line start signal and a scan line end reset signal. These signals may be utilized to produce a plurality of signals while a line is being scanned. Each of the plurality of signals is individually controlled. The scan line video signals and the plurality of signals are applied to a video signal amplifier in which the scan line video signals are controlled in accordance with the individually controlled plurality of signals.

8 Claims, 3 Drawing Figures

PERCIVAL T. GATES JR
ALBERT H. LIBBEY
INVENTORS
BY Ralph L. Cadwallader
Lawrence T. Benjamin
ATTORNEYS

FACSIMILE SCAN LINE RESPONSE EQUALIZATION SYSTEM

BACKGROUND OF THE INVENTION

Due to problems in the design of a facsimile transmitter the video signal produced during each line of scan varies in magnitude along the length thereof. Such variation may be due to variable lengths in the light paths from the ends and from the center of the lines to the photosensitive means producing the video signal. A variation in the video signal may also result from a variation in the light illuminating the scan line over the length thereof. Also variations in the video signal may result from imperfections in the lens system of the transmitter.

Heretofore systems have been used to overcome such difficulties in systems of this type. Among these is the structure shown in James U.S. Pat. No. 2,965,711 issued Dec. 20, 1960 which discloses a television circuit which uses a magnetic drum store to control the amplification of a video signal along the length of a scan line. The magnetic drum store is rotatable with the scanner. Appropriate signals are carried by the magnetic drum store so that the amplification of the video signal is varied along the length thereof so as to produce a video signal of uniform amplitude along its length.

SUMMARY OF THE INVENTION

In accordance with the present invention means are provided to produce a series of control pulses during the time that a line is being scanned by the facsimile scanner. In the embodiment described herein such pulse-producing means comprises a disc having light slots along its periphery and rotatable with the scanner. A light source illuminates the light slots and photosensitive means, appropriately positioned, receives flashes of light through these slots as the disc is rotated. The photosensitive means produces a series of pulses as its output. Adjustable electronic means which may, as herein described, include a shift register or a counter, receives these pulses and applies them, after they have been adjusted in the desired manner, to a video amplifier arranged to receive the video signal at its input. The video amplifier is also arranged to adjust the video signals in accordance with the adjusted pulses. The output of the video amplifier is a video signal of substantially uniform magnitude.

DESCRIPTION OF A PRACTICAL EMBODIMENT

Figures 1, 2:
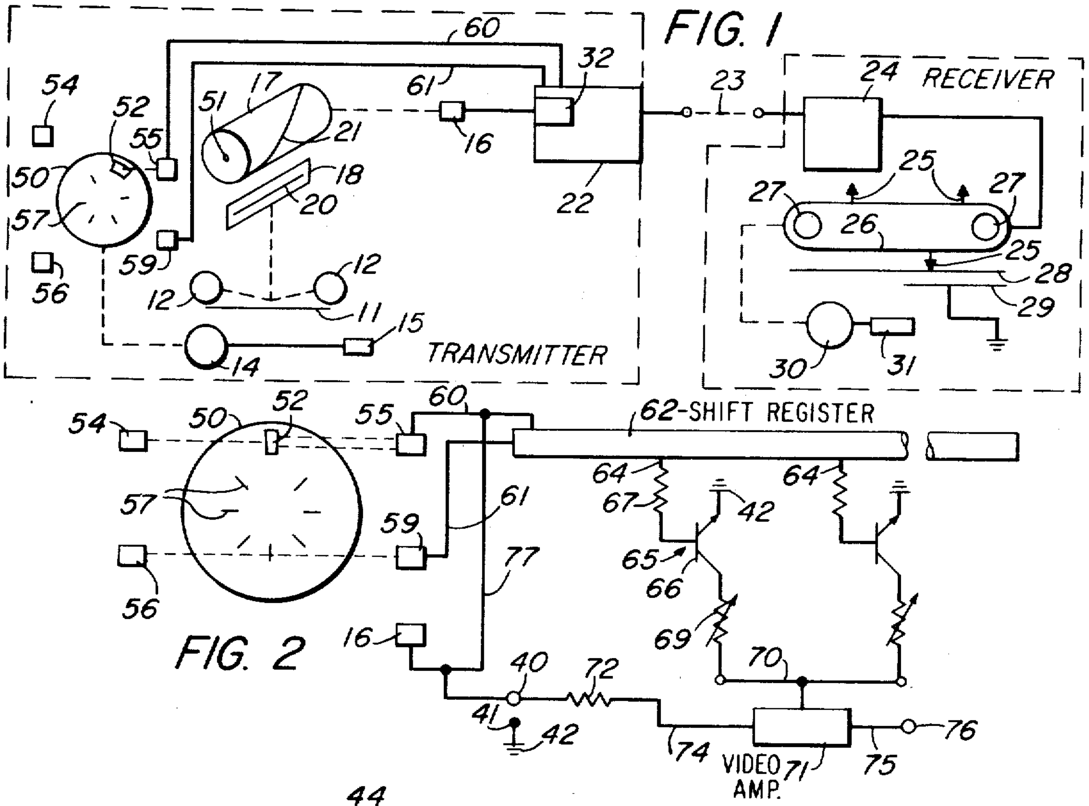
FIG. 1 schematically illustrates a facsimile transmitter and receiver including a circuit in accordance with the invention as part of the transmitter electronics.
FIG. 2 schematically illustrates a wiring diagram of one embodiment of the equalization system in accordance with the present invention.

FIG. 1 shows a facsimile transmitter with a document or photograph 11 being moved passed a pair of viewing lights 12 by a motor 14 operated by control 15. Interposed between copy 11 and photoelectric device 16 is a light dissector including rotatable helix drum 17 and fixed member 18 having straight, narrow, light path 20 positioned thereon. Rotatable drum 17 includes helical light path 21 adapted to cooperate with light path 20 so that light reflected from copy 11 is passed to the interior of helix drum 17 in a line-by-line image dissection. Helix drum 17 may be rotated by motor 14 or may be driven separately by another motor. Photoelectric device 16 detects the light passed to the interior of helix drum 17 and produces corresponding electrical signals. These electrical signals are transmitted through the usual transmitter electronics 22 and transmission line 23 to usual recorder electronics 24. Recorder electronics 24 applies its output to one or more equally spaced stylii 25 carried by belt 26 passed over a pair of rollers or pulleys 27. Motor 30 moves a suitable recording medium 28, preferably electrostatic paper, past the transverse path of stylii 25 and over grounded platen 29. Controlled frequency supply 31 furnishes power to motor 30.

In operation of the facsimile system, copy 11 moves past lamps 12 so that light is reflected through straight light path 20 and helical line path 21 in series to the interior of helix drum 17. Photoelectric device 16 detects this light and converts it to an analog signal that is applied through transmitter electronics 22, transmission line 23 and recorder electronics 24 to one of stylii 25. The electronics is such that a mark made on recording medium 28 by stylii 25 corresponds to a mark viewed by image dissector drum 17. If recording medium 28 is electrostatic paper, it is then passed through a toner for development as is well known in the art.

Figure 3A:
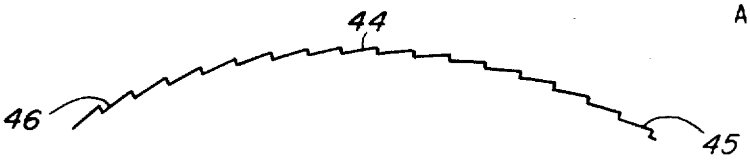
FIG. 3 presents a series of waveforms illustrating the action of the equalization system in accordance with the present invention. Waveform A of FIG. 3 illustrates an uncompensated scan line video signal. Waveform B of FIG. 3B indicates a back-stroke or phasing pulse signal used as a reset signal. Waveform C of FIG. 3C shows the video signal waveform A combined with the phasing or reset waveform B. Waveform D of FIG. 3D illustrates a plurality of pulse signals produced in accordance with the present invention. Waveform E of FIG. 3E shows the video signal waveform C after it has been compensated.

A practical embodiment of the scan line response equalization system of the present invention appears in schematic form in FIG. 2 and as block 32 in transmitter electronics 22 in FIG. 1. Photoelectric device 16 applies an uncompensated video scan signal to input terminals 40 and 41. Terminal 41 connects to ground 42. FIG. 3A shows such an uncompensated video scan signal as waveform A. Note that waveform A has its maximum amplitude generally along its center portion 44, and that its amplitude drops off at the starting end 45 and as the end of the scan line is approached at 46. Generally speaking, this will be the shape of the waveform produced when the scanner of a facsimile system scans a line of white copy.

Motor 14, in this embodiment, rotates disc 50 in synchronism with rotatable drum 17. If desired, rotatable disc 50 may be placed on shaft 51 supporting drum 17. Positioned along the periphery of disc 50 is an elongated backstroke pulse producing slot or light path 52. Note that light source 54 and photosensitive means 55 are positioned on each side of disc 50 in such a manner that slot 52 passes through the line of sight between them as disc 50 rotates. When this happens, light source 54 directs a beam of light onto photosensitive means 55 which produces a backstroke pulse. A second light source 56 is similarly arranged to project light through a plurality of slots or light paths 57 onto photosensitive means 59 positioned on the opposite side of disc 50. Slots 57 are spaced and arranged in a predetermined manner. Leads 60 and 61 transmit the output pulses of photosensitive means 55 and 59, respectively, to equalization system 32. In the practical embodiment herein described, equalization system 32 incorporates shift register 62 which receives input pulses over leads 60 and 61 and provides output pulses at a plurality of terminals 64. As many output pulses may be provided as desired corresponding to the design of shift register 62 and corresponding to the number of light slots 57 in disc 50. A pulse signal strength control amplifier 65 connects to each output terminal 64. Each amplifier 65 includes a transistor 66 having its emitter connected to ground 42 and its base connected through base resistor 67 to its corresponding shift register output terminal 64. Variable resistors 69 connect the collectors of transistors 66 to control bus 70 which connects to video amplifier 71. Video amplifier 71 connects to input terminal 40 through protective resistor 72 and lead 74. The output of video amplifier 71 connects through lead 75 to output terminal 76.

Equalization system 32 equalizes the uncompensated video signal received from photoelectric device 16. This video signal has a waveform A in FIG. 3A of amplitude greater in the center than at the ends. Equalization is achieved by using the output pulses of amplifiers 65 to modify the uncompensated video signal in amplifier 71 in such a manner that the waveform of the video signal appearing at output terminal 76 has substantially an equal amplitude from end to end. Slots 57 in disc 50 may be, if desired, equally spaced around the periphery of disc 50, or, alternatively, may be spaced non-uniformly. Non-uniform spacing is preferred because the rate of drop-off of the magnitude of waveform A is greater approaching ends 45 and 46 than closer to the center. With this in mind, slots 57 may be positioned closer together at locations corresponding to ends 45 and 46 of the scan line.

Figure 3B:
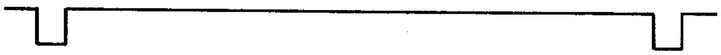

To adjust equalization system 32, the facsimile system is energized ready to transmit an image of a blank white sheet of copy. Light passing through phasing pulse slot 52 provides a phasing pulse to phase the transmitter in the usual manner. This phasing pulse appears as waveform B in FIG. 3B. Lead 77 combines this phasing pulse with the uncompensated scan line video signals produced by photosensitive means 16 and the combination is applied to input terminal 40 of equalization system 32.

Figure 3C:
Figure 3D:
Figure 3E:
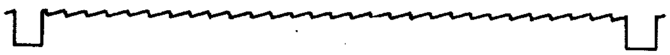

The waveform at input terminal 40 appears as waveform C in FIG. 3C. The output pulses of photosensitive means 59 appear as waveform D in FIG. 3D. Lead 61 transmits these pulses to shift register 62. Also, lead 60 transmits the phasing pulse produced by photosensitive device 55 to shift register 62. The phasing pulse acts as a reset pulse to reset shift register 62. As the pulses of waveform D pass through shift register 62 they sequentially actuate control amplifiers 65, the outputs of which are applied to video amplifier 71 by input bus 70. The output signals of control amplifiers 65 may be varied as desired by adjustment of variable resistors 69. These resistors may be adjusted while viewing waveform E of FIG. 3E at output terminal 76 of video amplifier 71 on an oscilloscope. Adjustment of the various resistors 69 continues until output waveform e, as viewed on the oscilloscope, is practically a straight line along the length of the scan line.

While the invention has been described and illustrated with reference to a practical embodiment, it will be understood that other embodiments may be resorted to without departing from the invention. For example, a scan line start signal and a scan line end signal may be derived and substituted for the backstroke pulse produced by means of slot 52 in disc 50. The start signal may then be used to gate on and the end signal to gate off electronics that produces a plurality of signals, each of which may be controlled and transmitted to video amplifier 71. Alternatively, a counter system may be utilized instead of shift register 62. Similarly, the plurality of pulses may be utilized in a number of ways well known in the art to control the magnitude of the video signal pulses. For example, bus 70 and lead 74 may be connected to the same input terminal of video amplifier 71. Variable resistors 69 are then adjusted to produce output video pulses at terminal 76 of substantially equal magnitude. Thus, the invention set out above should be considered as demonstrative and not as limiting the scope of the following claims.

We claim:

1. A facsimile scan line response equalization system comprising:

- means providing a source of facsimile scan line video signals inherently having a non-uniform response along each scan line;
- means producing a scan line end reset signal;
- means producing a plurality of sensor signals spaced in time during the time each line is being scanned;
- a shift register having an input terminal, a reset terminal and a plurality of output terminals;
- means applying said plurality of sensor signals to said shift register input terminal to provide corresponding actuating signals sequentially along said output terminals;
- means applying the scan line end reset signal to said shift register reset terminal for resetting the shift register at the end of each scan line;
- a plurality of adjustable amplifiers so connected that each output terminal of the shift register is connected to a separate adjustable amplifier, the amplifiers having their output terminals connected to a common bus, said actuating signals actuating said amplifiers sequentially to provide a sequence of adjustable signals at said common bus;
- a video signal amplifier having
  - an output terminal,
  - a first input terminal connected to receive said scan line video signals,
  - a second input terminal connected to receive said sequence of adjustable signals, and
  - means utilizing said sequence of adjustable signals to modify said scan line video signals, providing modified scan line video signals at said output terminal,
  - the adjustable amplifiers being differently adjusted to provide the proper non-uniform adjustable signals to compensate for said non-uniform response of said scan line video signals.

2. A facsimile scan line response equalization system according to claim 1 in which the means producing the scan line end reset signal includes a disc rotatable once for each line scanned, and means carried by the disc for indicating a rotation thereof and controlling the means producing said scan line end reset signal.

3. A facsimile scan line response equalization system according to claim 2 in which the means indicating a rotation thereof is a light slot in the disc, a light source is positioned on one side of the disc directing light towards the slot, and photosensitive means is positioned on the opposite side of the disc to receive light transmitted therethrough and produce a control signal.

4. A facsimile scan line response equalization system according to claim 1 in which the means producing a plurality of sensor signals includes a disc rotatable once for each line scanned, and means carried by the disc for indicating its degree of rotation at spaced points.

5. A facsimile scan line response equalization system according to claim 4 in which the means carried by the disc for indicating the degree of its rotation at spaced points comprises a plurality of light slots.

6. A facsimile scan line response equalization system according to claim 5 in which the light slots are uniformly spaced.

7. A facsimile scan line response equalization system according to claim 5 in which the light slots are non-uniformly spaced.

8. A facsimile scan line response equalization system according to claim 5 in which light source means is positioned at one side of the disc, and photosensitive means is positioned at the opposite side of the disc to receive light transmitted through the slots to produce the signals.

* * * * *